(12) United States Patent
Nordgren et al.

(10) Patent No.: US 12,507,991 B2
(45) Date of Patent: Dec. 30, 2025

(54) STERILE COVERS FOR ULTRASOUND TRANSDUCER

(71) Applicant: CIVCO Medical Instruments Co., Inc., Kalona, IA (US)

(72) Inventors: Gregory Nordgren, North Liberty, IA (US); Geoffrey Scott Wagner, Fairfax, IA (US)

(73) Assignee: CIVCO Medical Instruments Co., Inc., Kalona, IA (US)

( * ) Notice: Subject to any disclaimer, the term of this patent is extended or adjusted under 35 U.S.C. 154(b) by 0 days.

(21) Appl. No.: 18/670,152

(22) Filed: May 21, 2024

(65) Prior Publication Data

US 2024/0307032 A1    Sep. 19, 2024

Related U.S. Application Data

(63) Continuation of application No. 15/963,618, filed on Apr. 26, 2018, now abandoned.

(Continued)

(51) Int. Cl.
*A61B 8/00* (2006.01)
*A61B 1/00* (2006.01)
(Continued)

(52) U.S. Cl.
CPC ........ *A61B 8/4422* (2013.01); *A61B 1/00142* (2013.01); *A61B 8/4281* (2013.01);
(Continued)

(58) Field of Classification Search
CPC . A61B 8/4422; A61B 1/00142; A61B 8/4281; A61B 46/10; A61L 31/06; A61L 31/10; A61L 2420/08
See application file for complete search history.

(56) References Cited

U.S. PATENT DOCUMENTS

| 5,107,988 A | 4/1992 | Bala |
| 5,522,878 A | 6/1996 | Montecalvo et al. |

(Continued)

FOREIGN PATENT DOCUMENTS

| JP | 63-68306 U | 5/1988 |
| JP | H11188046 A | 7/1999 |

(Continued)

OTHER PUBLICATIONS

KR-101406551-B1—translation (Year: 2014).*

(Continued)

*Primary Examiner* — Christopher Koharski
*Assistant Examiner* — Renee C Langhals
(74) *Attorney, Agent, or Firm* — Benesch Friedlander Coplan & Aronoff LLP

(57) ABSTRACT

An ultrasound transducer sheath includes a first portion comprising a first flexible material. The first portion forms a cylinder defining a passage between a first end and an opposite second end of the first portion. A second portion comprising a second flexible material is coupled to the first end of the first portion. The second portion forms an impermeable planar layer having an exterior surface and an opposing interior surface. A first hydrophilic coating layer is formed on the exterior surface of the impermeable planar layer. The first hydrophilic coating layer is activatable to provide an acoustic coupling interface between an ultrasound transducer and a patient.

10 Claims, 9 Drawing Sheets

Related U.S. Application Data

(60) Provisional application No. 62/490,993, filed on Apr. 27, 2017.

(51) Int. Cl.
*A61B 46/10* (2016.01)
*A61L 31/06* (2006.01)
*A61L 31/10* (2006.01)

(52) U.S. Cl.
CPC ............ *A61B 46/10* (2016.02); *A61L 31/06* (2013.01); *A61L 31/10* (2013.01); *A61L 2420/08* (2013.01)

(56) References Cited

U.S. PATENT DOCUMENTS

| | | | |
|---|---|---|---|
| 5,676,159 | A | 10/1997 | Navis |
| 5,795,632 | A | 8/1998 | Buchalter |
| 5,910,113 | A | 6/1999 | Pruter |
| 6,039,694 | A | 3/2000 | Larson et al. |
| 6,719,699 | B2 | 4/2004 | Smith |
| 6,846,291 | B2 | 1/2005 | Smith et al. |
| 10,085,716 | B2 | 10/2018 | Romano et al. |
| 10,206,653 | B2 | 2/2019 | Desai et al. |
| 2004/0133144 | A1* | 7/2004 | Crichton ............... A61F 15/004 602/62 |
| 2005/0215901 | A1* | 9/2005 | Anderson ............... A61B 8/12 600/445 |
| 2005/0261586 | A1* | 11/2005 | Makin .................... A61B 8/546 600/459 |
| 2006/0063997 | A1* | 3/2006 | Prisco ..................... A61B 3/16 600/398 |
| 2006/0264751 | A1 | 11/2006 | Wendelken et al. |
| 2008/0139944 | A1 | 6/2008 | Weymer et al. |
| 2010/0004543 | A1* | 1/2010 | Ahlund .............. A61B 1/00142 600/459 |
| 2010/0234733 | A1 | 9/2010 | Wahlheim |
| 2013/0060143 | A1 | 3/2013 | LaPlante et al. |
| 2015/0018686 | A1 | 1/2015 | Berard-Andersen |
| 2015/0069728 | A1 | 3/2015 | Seitz, III |
| 2015/0305709 | A1 | 10/2015 | Tomassi et al. |
| 2016/0192903 | A1 | 7/2016 | Nordgren |
| 2016/0331344 | A1* | 11/2016 | Hadzic ................... A61B 8/085 |
| 2017/0128042 | A1* | 5/2017 | Desai .................. A61B 8/4281 |
| 2019/0099157 | A1 | 4/2019 | Wagner |

FOREIGN PATENT DOCUMENTS

| | | | | |
|---|---|---|---|---|
| KR | 101406551 | B1 * | 6/2014 | |
| WO | WO-2009009064 | A1 * | 1/2009 | ......... A61B 17/2251 |
| WO | WO-2009077176 | A1 * | 6/2009 | ............. A61B 46/10 |
| WO | 2016109520 | A1 | 7/2016 | |

OTHER PUBLICATIONS

WO-2009077176-A1—translation (Year: 2009).*
International Search Report and Written Opinion issued in corresponding International Application No. PCT/US2018/029566, mailed on Jul. 12, 2018, 14 pages.
Sonofast, a YouTube video retrieved online https://www.youtube.com/watch?v=7gibbz6r48k, Apr. 26, 2018.
Polymer Science, Inc. Technical Datasheet: PS-2056 (Dev), Revision 050115, one page.
Final Office Action issued in U.S. Appl. No. 15/963,618, dated Aug. 19, 2022.
Non-Final Office Action issued in U.S. Appl. No. 15/963,618, dated Apr. 5, 2022.
Final Office Action issued in U.S. Appl. No. 15/963,618, dated Aug. 30, 2021.
Non-Final Office Action issued in U.S. Appl. No. 15/963,618, dated Mar. 15, 2021.
Non-Final Office Action issued in U.S. Appl. No. 15/963,618, dated Sep. 28, 2020.

* cited by examiner

FIG. 7A  FIG. 7B  FIG. 7C

STERILE COVERS FOR ULTRASOUND TRANSDUCER

CROSS-REFERENCE TO RELATED APPLICATIONS

This application is a continuation of prior application Ser. No. 15/963,618, filed Apr. 26, 2018, which claims the benefit of U.S. Provisional Application No. 62/490,993, filed on Apr. 27, 2017, the entirety of both applications are hereby incorporated by reference herein.

BACKGROUND

This invention relates to medical devices and more particularly to ultrasound probes and devices for covering the probe for use in aseptic applications.

Ultrasound transducers are commonly used in sterile environments, yet it is impractical and expensive to keep the transducers and their accompanying signal cable sterile. Sterilization is time-consuming and not typically performed in the area where the ultrasound equipment is used (e.g., the operating or procedure room). Because ultrasound transducers are expensive, maintaining sufficient numbers of available sterilized units is cost-prohibitive. Thus, a common practice is to encapsulate or cover the ultrasound transducer in a sterile and disposable sheath, typically formed as an elongate bag of polymeric material such as latex, polyethylene, or polyurethane.

During application of such a sheath, practitioners must ensure non-sterile portions of the transducer, such as the housing, the signal cable, etc., are not permitted to contact any sterile element, such as medical practitioner's gloved hands, etc. Because transducer sheaths may be long (to accommodate an entirety of a transducer housing, in particular for endocavity applications), it may be difficult to apply a cover to a transducer probe without a high risk of contaminating the sterile field, particularly by a single individual.

Furthermore, during use, the sheath is typically opened, and a quantity of conductive gel is placed in the bottom of the sheath to aid in transduction of ultrasound energy to the probe. Because the configuration of the sheath may be both long and narrow, application of the gel at the bottom of the sheath where it will contact the transducer head is difficult to accomplish without gel being disadvantageously redistributed along other portions of the sheath or transducer probe body and/or its attached signal cable, thus further rendering the process of covering a transducer probe both complex and messy.

It is difficult for the user to access the target surface for gel application and probe insertion with current fold methods associated with ultrasound sheaths, as the sheath needs to be held open with a hand and the folded portion is not compact, causing the target surface to be several inches deep inside the sheath. Keeping the gel, which is non-sterile, out of contact with the practitioner's hands, while also avoiding spreading the gel to other parts of the probe and the signal cable is a difficult task.

BRIEF DESCRIPTION OF THE DRAWINGS

FIGS. 7A-7D illustrate cross-sectional views of a sheath assembly consistent with implementations described herein in various stages of assembly;

DETAILED DESCRIPTION OF THE PREFERRED EMBODIMENTS

The following detailed description refers to the accompanying drawings. The same reference numbers in different drawings may identify the same or similar elements. Also, the following detailed description does not limit the invention.

Implementations described herein relate to protective sheaths for providing sterile coverings for ultrasound transducers. Consistent with one implementation described herein, a sheath may include a first portion formed into a generally tubular configuration for covering a periphery of an ultrasound transducer and a second portion disposed at an open end of the first portion. As described herein, the second portion may be formed of a different material or combination of materials than the first portion. In one embodiment, the second portion is configured to engage an operating end of the ultrasound transducer and is formed of a material having an adhesive layer provided on an inside surface of the second portion. During use, the adhesive layer adheres to the transducer to provide both a positive, consistent coupling between the sheath and the transducer, and as well as a positive acoustic coupling that facilitates clear and more efficient transmission of ultrasound signals therethrough and eliminates the need to place coupling gel within the sheath.

Figure 1:
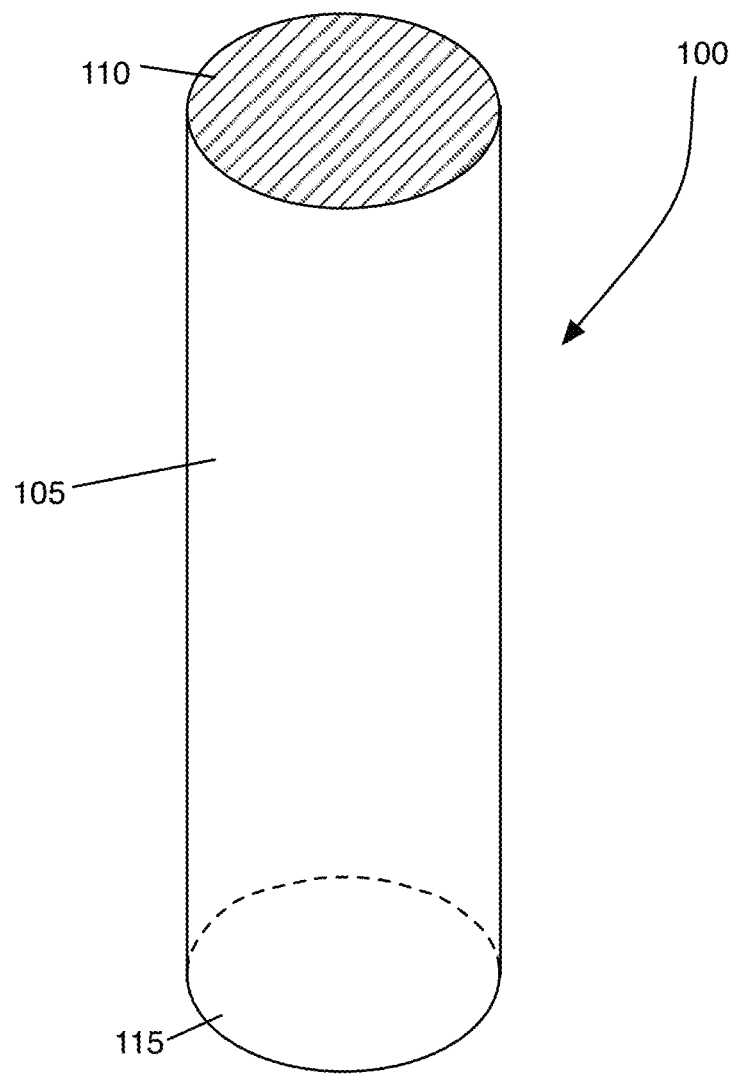
FIG. 1 is a perspective view of a first embodiment of an ultrasound transducer sheath consistent with embodiments described herein.
Figure 2:
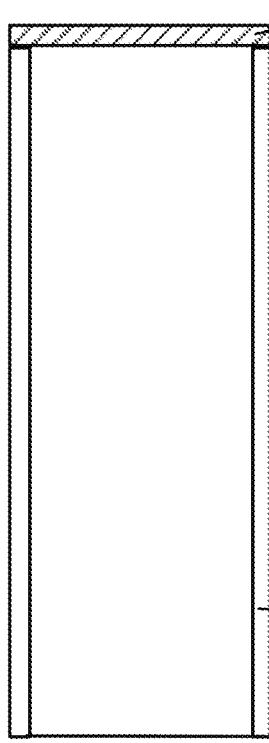
FIG. 2 is a cross-sectional view of the ultrasound transducer sheath of FIG. 1.

FIGS. 1 and 2 are perspective and cross-sectional views of a first embodiment of an ultrasound transducer sheath 100, respectively, consistent with embodiments described herein. As shown, sheath 100 includes a generally tubular or sleeve-like configuration having a first tubular portion 105 and a second planar portion 110 disposed at one end of tubular portion 105. The opposing end of tubular portion 105 distal from planar portion 110 forms an opening 115 into which the ultrasound transducer is received during use.

Consistent with embodiments described herein, tubular portion 105 may be formed of any suitably flexible material, such as polyethylene, polyurethane, polychloroprene, etc. In one implementation, tubular portion 105 is formed of polyether polyurethane having a thickness of approximately 0.25 millimeters (mm) or less. In contrast to tubular portion 105, planar portion 110 may be formed of multilayer composition. FIGS. 3A-3D illustrate cross-sectional views of exemplary implementations of planar portion 110.

Figure 3A:
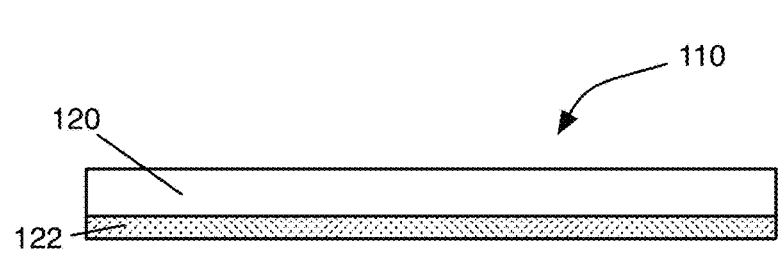
FIGS. 3A-3D illustrate cross-sectional views of exemplary implementations of the planar portion of FIGS. 1 and 2.

As shown in FIG. 3A, planar portion 110 includes a substrate layer 120, such as a polyurethane carrier or material having a thickness ranging from approximately 0.025 to 1.0 mm. Consistent with embodiments described herein, planar portion 110 further includes a hydrophilic coating layer 122 applied to one side of substrate layer 120. In this configuration, hydrophilic coating layer 122 is provided on an outside of sheath 100. During use, an acoustic coupling gel may be applied to an inside of substrate layer 120 prior to applying sheath to the ultrasound probe. Next, hydrophilic coating layer 122 may be activated using only water or saline to provide the requisite acoustic coupling interface between sheath 100 and a patient.

Figure 3B:
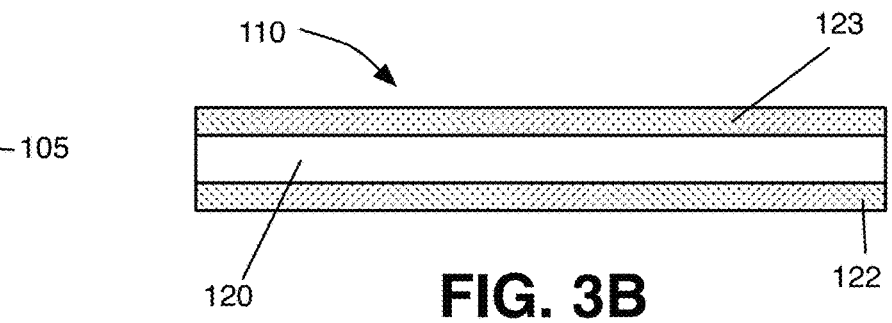

FIG. 3B illustrates an embodiment of planar portion 110 that includes a second hydrophilic coating layer 123 applied on a side of substrate layer 120 opposite from hydrophilic coating layer 122. During use, hydrophilic coating layers 122 and 123 may each be activated using only water or saline to provide the requisite acoustic coupling interface between a transducer, sheath 100, and a patient.

Figure 3C:
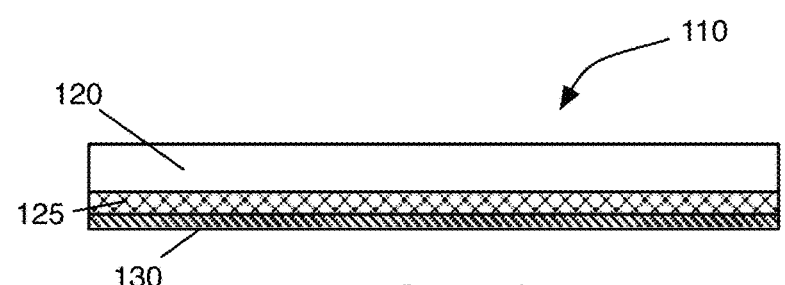

As shown in FIG. 3C, planar portion 110 includes substrate layer 120 and an adhesive layer 125. In one embodiment, adhesive layer 125 comprises a silicone gel adhesive coating layer having a thickness ranging from approximately 0.025 to 0.2 mm. As shown in FIG. 3C, prior to use, planar portion 110 includes a release layer 130 (also referred to as a liner) that is provided on adhesive layer 125 to protect the tackiness of adhesive layer 125 and to prevent adhesive layer 125 from adhering to tubular portion 105 or any other elements (e.g., sheath deployment components, described below) prior to use. In one implementation, release layer 130 comprises a polycarbonate layer.

Figure 3D:
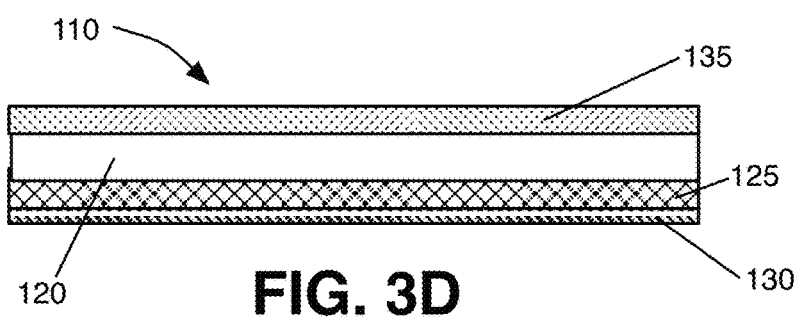

FIG. 3D illustrates an alternative embodiment of planar portion 110. As shown, in addition to substrate layer 120 and adhesive layer 125, planar portion 110 may further include a hydrophilic coating layer 135 applied to substrate layer 120 opposite to adhesive layer 125. In this configuration, adhesive layer 125 is provided on an inside of sheath 100, while hydrophilic coating 135 is provided on an outside of sheath 100. During use, hydrophilic coating layer 135 may be activated using only water or saline to provide the requisite acoustic coupling interface between a transducer, sheath 100, and a patient.

Consistent with embodiments described herein, tubular portion 105 may be formed of any suitable shape, size, or length to accommodate various styles or types of ultrasound transducer. For example, in some embodiments, tubular portion 105 may be formed with a substantially rectangular configuration, while in other embodiments tubular portion 105 may be formed with a generally oval or circular configuration.

Planar portion 110 may be integrated or joined to tubular portion 105 in any suitable manner to provide an integrated sheath 100 after manufacture. In one exemplary implementation, planar portion 110 is joined using a heat impulse seal with a cut wire to remove any excess portions. The cut wire and heating element are used to create a thermal or hermetic seal and the cut can be designed in various shapes, according to the particular application. In other embodiments, planar portion 110 may be glued or otherwise chemically bonded to tubular portion 105.

Figure 4:
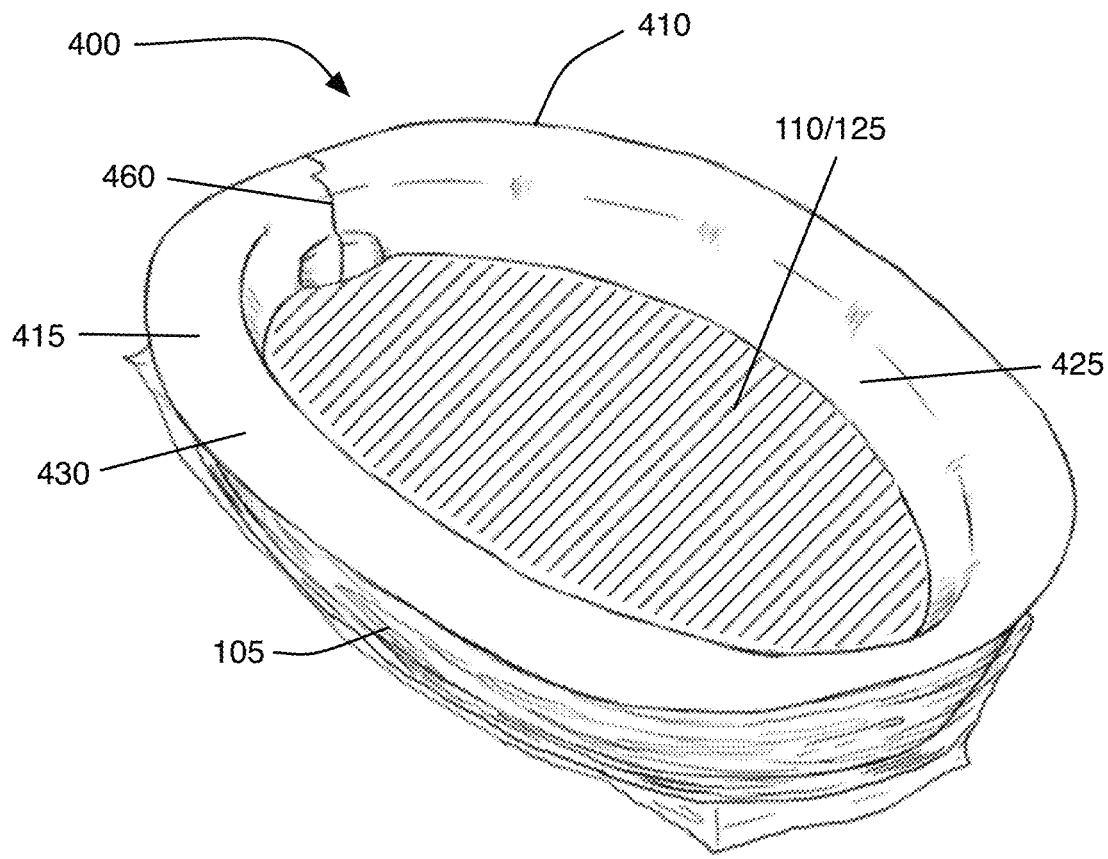
FIG. 4 is a perspective view of a sheath assembly in a collapsed or as-packaged configuration.
Figure 5:
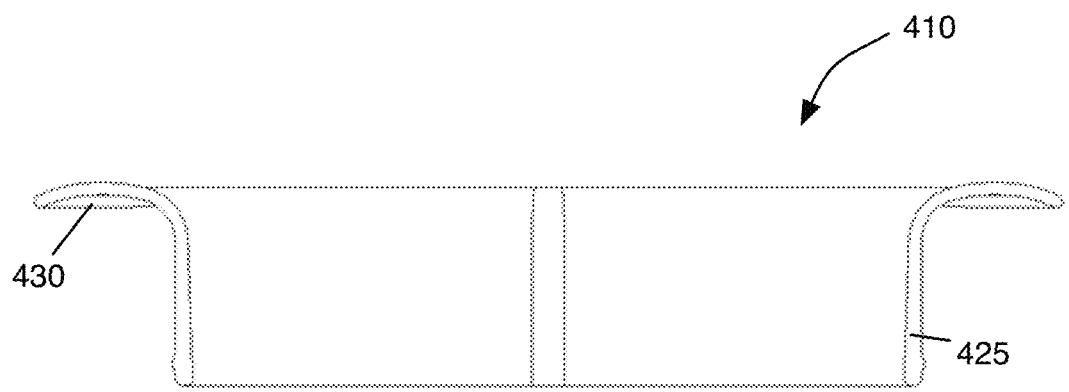
FIG. 5 is a cross-sectional view of the deployment mechanism of FIG. 4.

Consistent with embodiments described herein, ultrasound sheath 100 may be integrated with a number of deployment mechanisms for facilitating one person application of sheath 100 on an ultrasound transducer. FIG. 4 is a perspective view of a sheath assembly 400 that includes sheath 100 and a first deployment mechanism 410 in a collapsed or as-packaged configuration. FIG. 5 is a cross-sectional view of deployment mechanism 410 and FIG. 6 is a side view of sheath assembly 400 in a deployed or in-use configuration.

Figure 6:
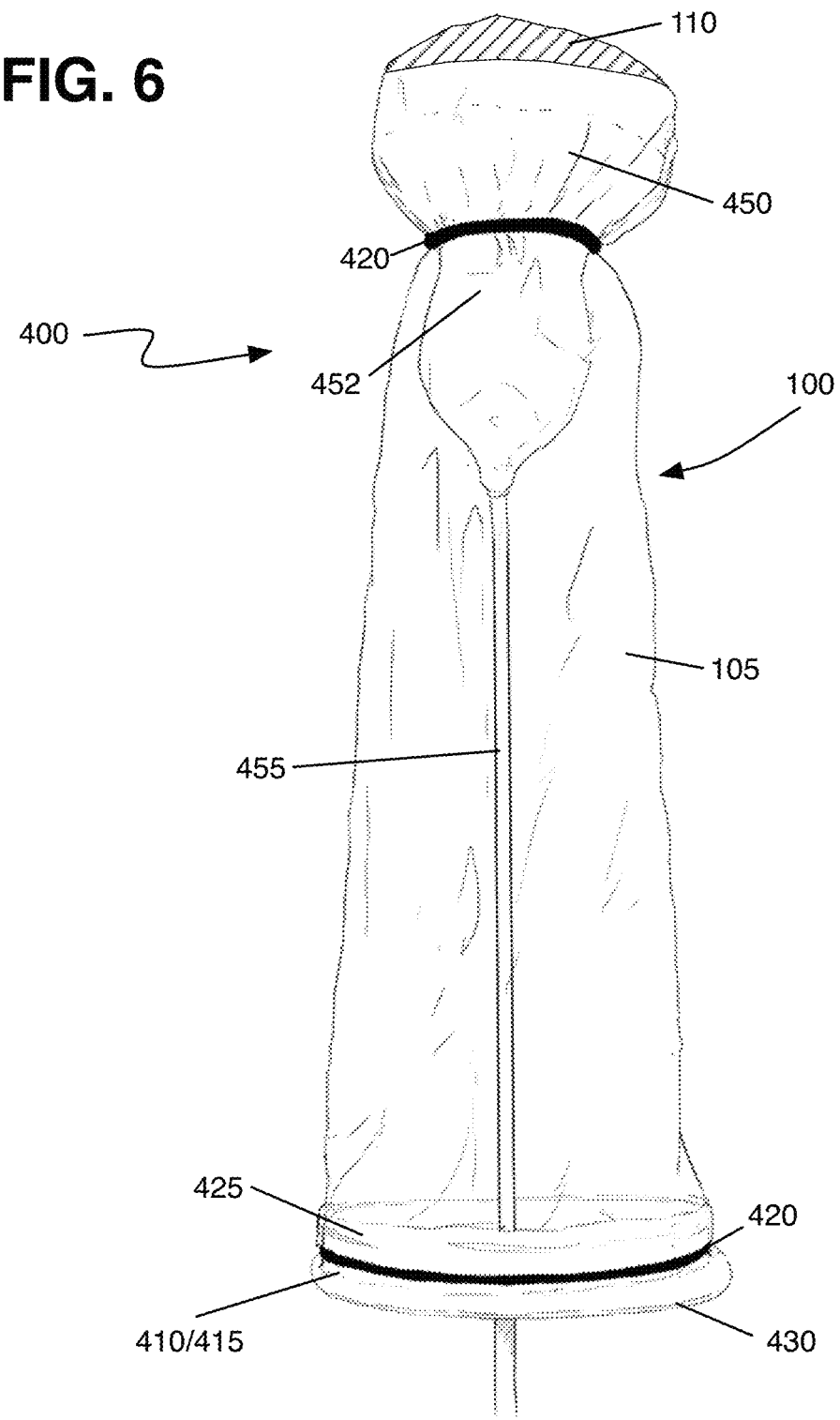
FIG. 6 is a side view of the sheath assembly of FIG. 4 in a deployed or in-use configuration.

As shown in FIGS. 4-6, deployment mechanism 410 includes a generally ring-shaped applicator 415 and multiple elastic bands 420 (most clearly shown in FIG. 6). Ring-shaped applicator 415 is formed of a rigid material (such as a plastic or polymer) and is secured to open end 115 of tubular portion 105. In one implementation, ring-shaped applicator 415 is sized so as to be frictionally retained within open end 115 until forcibly removed. As shown in FIG. 5, ring-shaped applicator 415 includes a body portion 425 and a circumferential lip 430 that extends radially outwardly from body portion 425 and aids in deployment of sheath 100.

In its pre-deployment or collapsed configuration, as shown in FIG. 4, tubular portion 105 of sheath 100 is folded accordion-style along its length and retained on the outside of body portion 425, such that planar portion 110 is substantially flush with a portion of body portion 425 distal from circumferential lip 430. The elastic bands 420, shown in FIG. 6, are stretched around the outside of folded tubular portion 105 of sheath 100 as it is placed onto the ring-shaped applicator 415. Elastic bands 420 are placed at intervals from the closed-end (planar portion 110) to the open end 115 of sheath 100, and drawn together within the accordion-style fold, helping to retain the folded sheath onto the ring-shaped applicator 415.

During use, release layer 130 may be removed from adhesive layer 125 and a transducer 450 (FIG. 6) may be inserted into the body portion 425 of ring shaped applicator 415 and brought into contact with the exposed adhesive layer 125 of planar portion 110. The sheath-covered portion of the transducer 450 is then grasped through planar portion 110 and the open end 115 of sheath 100 is pulled along the length of the transducer 450 and transducer signal cable 455, as shown in FIG. 6, by holding ring-shaped applicator 415 and pulling lip 430 away from the transducer 450 thus causing tubular portion 105 of sheath 110 to unfold from ring-shaped applicator 415.

As tubular portion 105 of sheath 110 unfolds over transducer 450, the elastic bands 420 are transferred one-by-one to transducer handle 452 and signal cable 455, both releasing sheath 100 from the ring-shaped applicator 415 and securing sheath 100 to transducer 450/cable 455 in a form-fitting manner along its length. In some embodiments, it may be necessary to forcibly remove ring-shaped applicator 415 from open end 115 of sheath 100 even after the final elastic band 420 is transferred from ring-shaped application 415.

When the full length of sheath 100 has been deployed, ring-shaped applicator 415 may be removed from transducer signal cable 455 by flexing the applicator 415 apart at break 460 (shown in FIG. 4) and pulling applicator 415 off of signal cable 455.

FIGS. 7A-7D illustrate cross-sectional views of a sheath assembly 700 that includes sheath 100 and a second deployment mechanism 710 at various stages of assembly. FIG. 8 is a perspective view of sheath assembly 700 in a collapsed configuration and FIG. 9 is a side view of sheath assembly 700 in a mid-deployment configuration.

As shown in FIG. 7A, to form sheath assembly 700, sheath 100 is initially folded in half concentrically within itself, such that planar portion 110 and opening 115 are even with each other, as shown by dashed lines in FIG. 7A, with the "outer" half of the tubular portion 105 shown in solid lines while the "inner" half of tubular portion 105 is shown in dashed lines. This method of folding the cover is very fast and easy, and offers potential cost savings and excellent scalability for volume manufacturing. To facilitate deployment, deployment mechanism 710 includes a flexible band or ring 715 placed at the fold point 720, as shown in FIG. 7B, and a pull tab 725 secured to open end 115 of tubular portion 105.

Figure 7D:
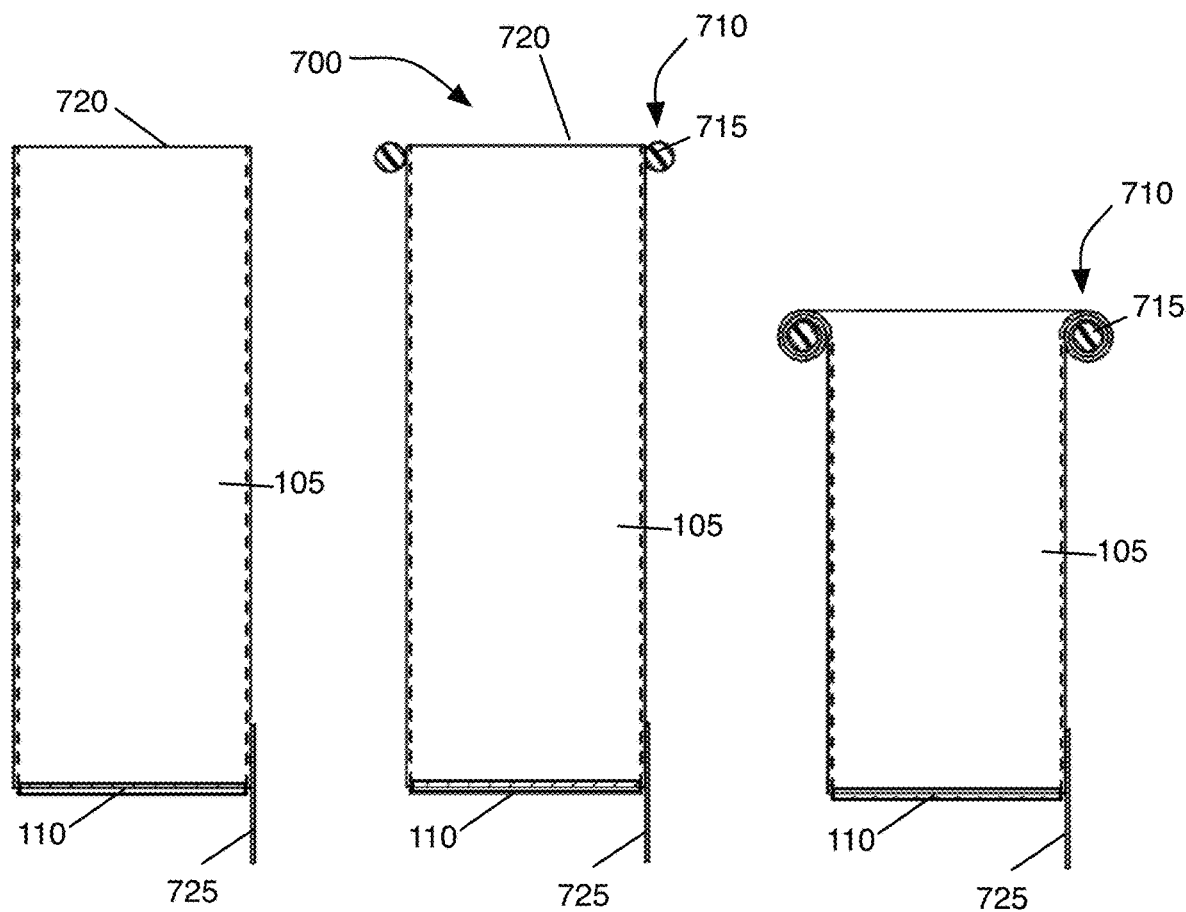
Figure 7D:
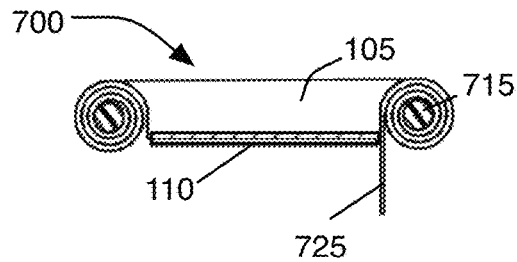
Figure 8:
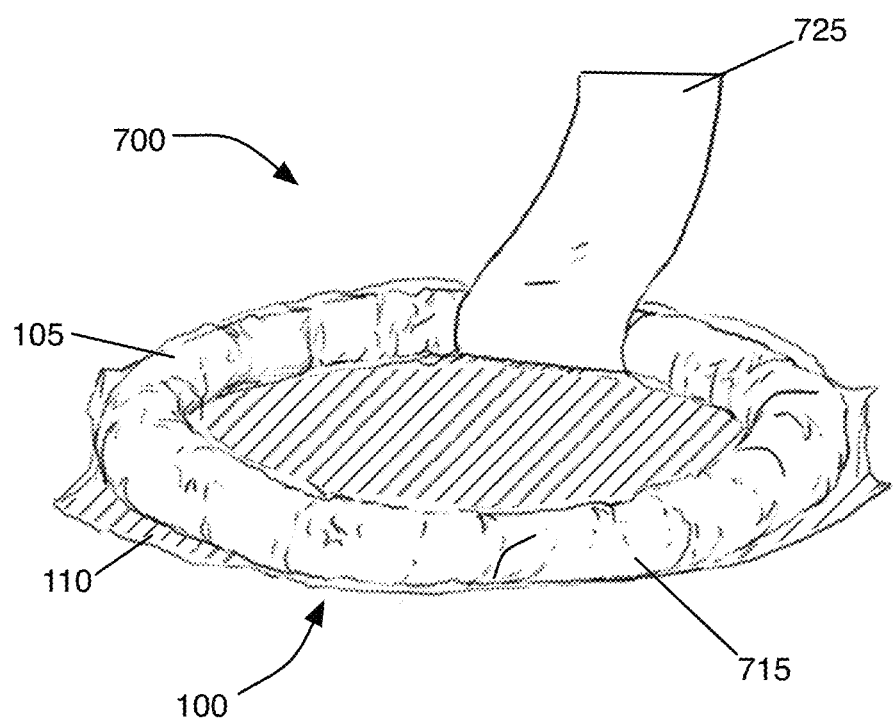
FIG. 8 is a perspective view of the sheath assembly of FIGS. 7A-7D in a collapsed configuration.

During assembly, folded sheath 100 may be rolled around flexible band 715 to collapse sheath 100 into a compact state while leaving the planar portion 110 and pull tab 725 accessible to the user, as shown in FIGS. 7C, 7D, and 8. Although not depicted in the Figures, in some implementations, the configuration of FIGS. 7A-7D may be achieved without the use of flexible band 715 by rolling sheath 100 about itself.

Figure 9:
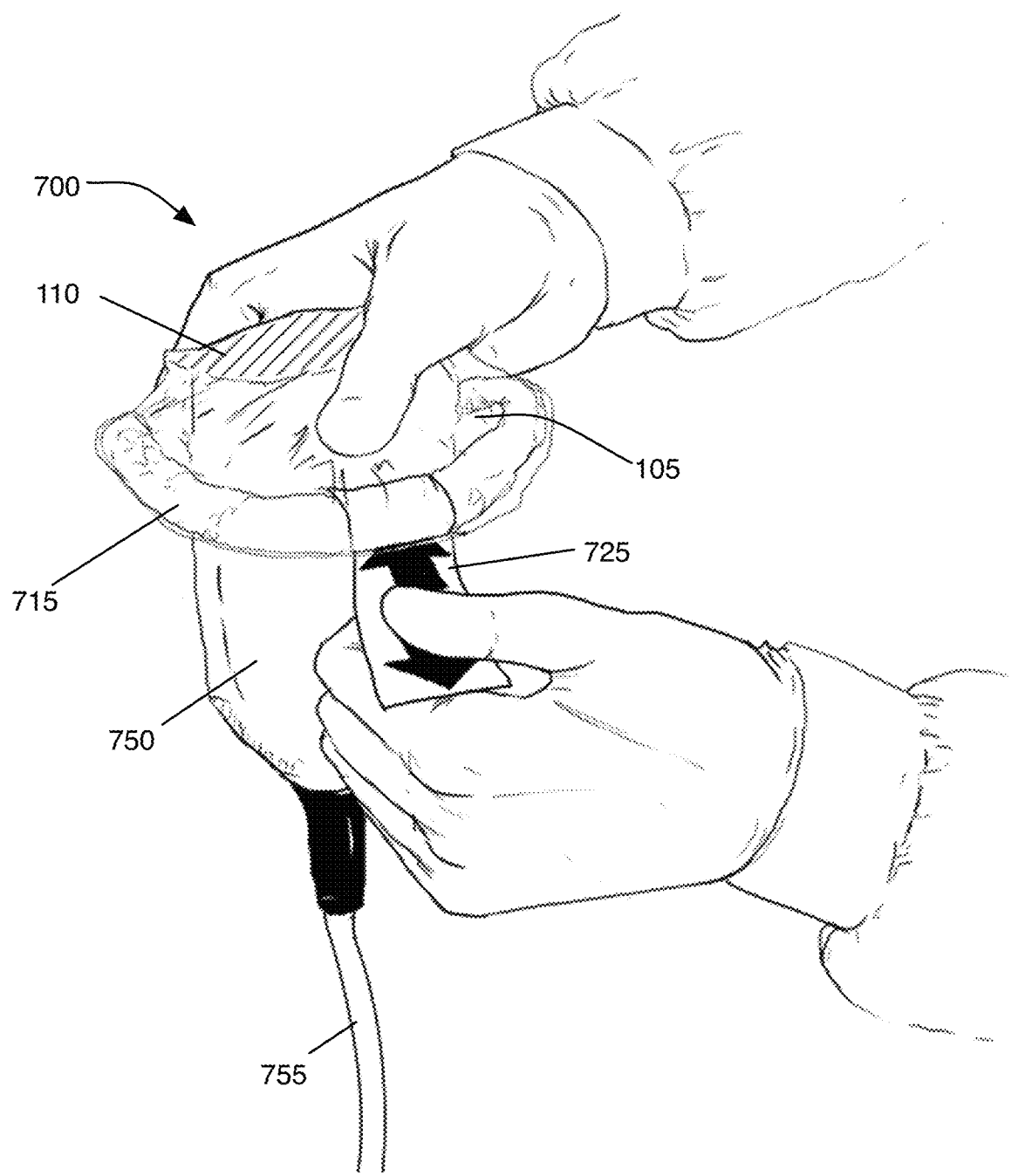
FIG. 9 is a side view of the sheath assembly of FIGS. 7A-7D in a mid-deployment configuration.

As shown in FIG. 9, in use, a user removes release layer 130 and places sheath assembly 700 over ultrasound transducer 750 such that transducer 750 engages adhesive layer 125. The user then pulls the tab 725 causing the sheath to un-roll along the length of transducer 750 and signal cable 755. To facilitate removal following deployment, flexible band 715 may include a break point or perforation, such that force applied to the break point may be sufficient to open flexible band 715 to allow it to be removed from signal cable 755.

Figure 10A:
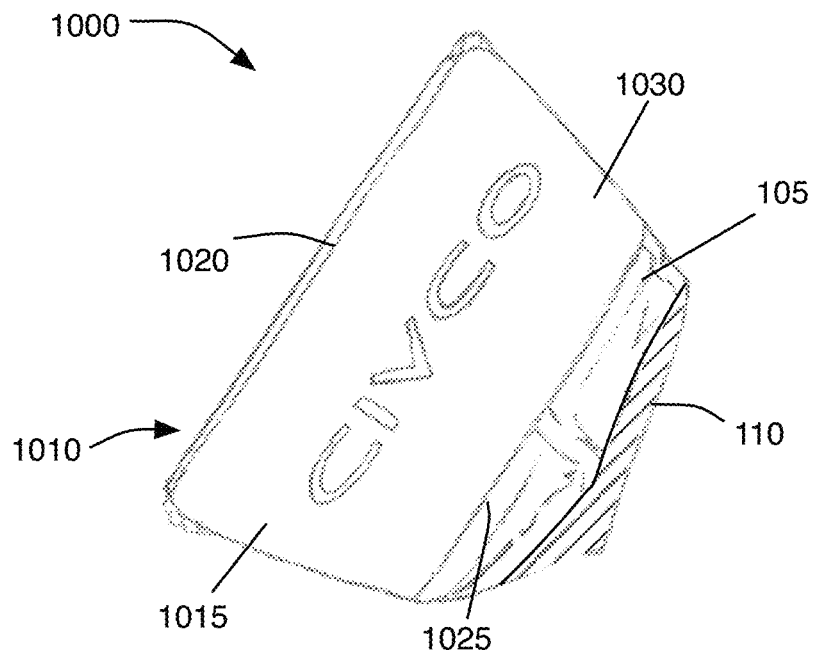
FIGS. 10A and 10B illustrate side and top views, respectively, of another embodiment of a sheath assembly consistent with implementations described herein.
Figure 10B:
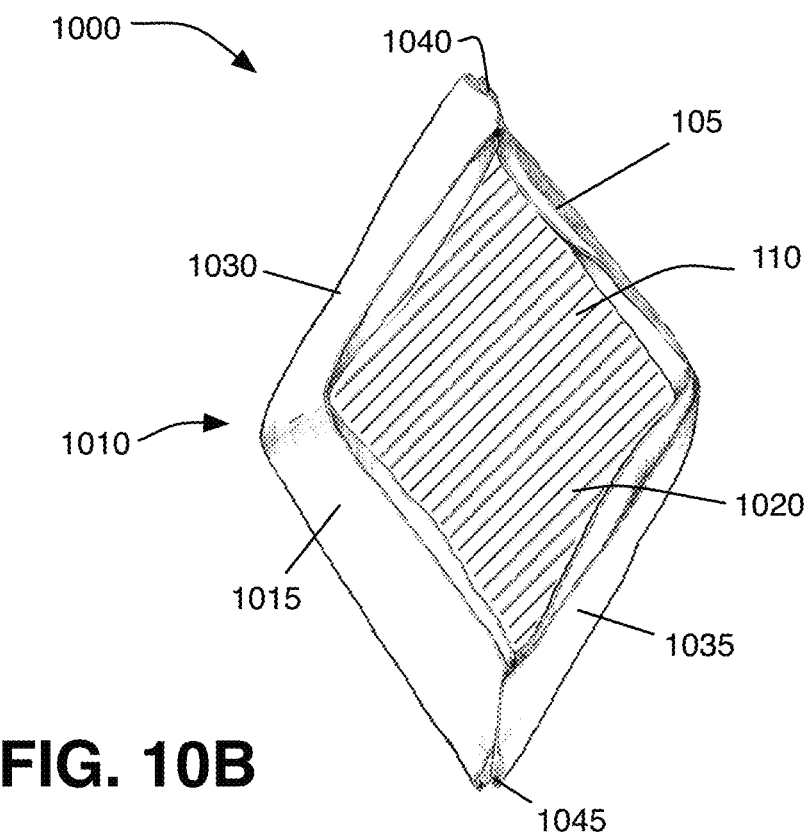
Figure 11:
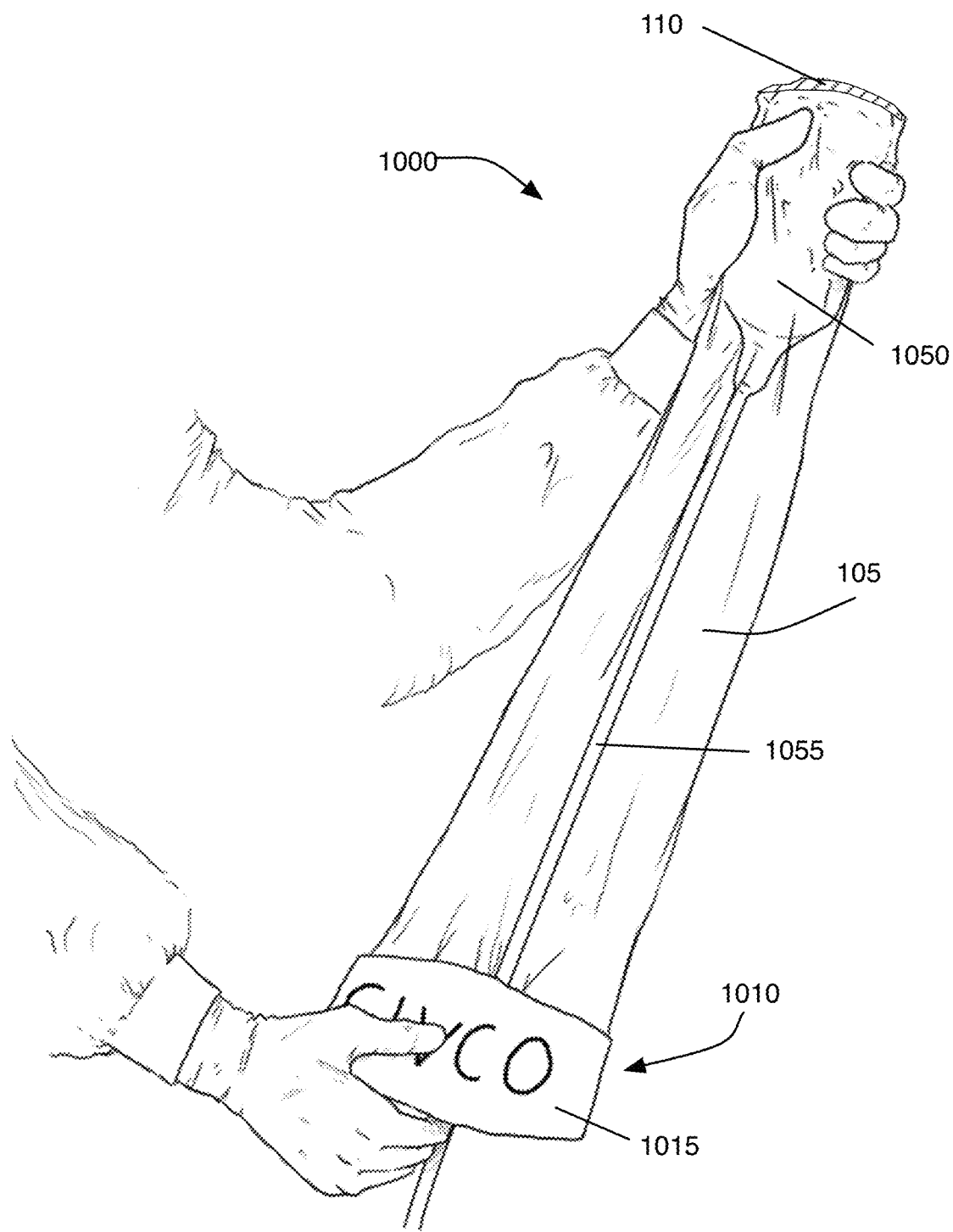
FIG. 11 is a side view of the sheath assembly of FIGS. 10A and 10B in a deployed configuration.

FIGS. 10A and 10B illustrate side and top views, respectively, of a sheath assembly 1000 that includes a deployment mechanism 1010. FIG. 11 is a side view of sheath assembly 1000 in a deployed configuration.

As shown in FIGS. 10A and 10B, deployment mechanism 1010 includes a semi-rigid dual-walled pouch 1015 having two open ends 1020, 1025, and dual walls 1030 and 1035 configured to oppose each other. During assembly, tubular portion 105 of sheath 100 is folded, accordion-style, and open end 115 of sheath 100 is secured between dual walls 1030/1035 of pouch 1015. In use, a user initially removes release layer 130 and inserts transducer 1050 into pouch 1015 such that the transducer 1050 engages adhesive layer 125. The user grasps transducer 1050 through planar portion 110 of sheath 100 and pulls on pouch 1015 to dispense sheath 100 from bottom opening 125 of pouch 1015 along the length of transducer 1050 and signal cable 1055, as shown in FIG. 11.

Consistent with embodiments described herein, pouch 1015 may be formed of cardboard or plastic or any other suitable material and may be configured to snap open when grabbed at the corners 1040/1045. Sheath 100 may be folded or stuffed inside pouch 1015 as shown in FIG. 10A such that pouch 1015 holds/encompasses or contains sheath 100 prior to use.

Advantages of pouch-type deployment mechanism 1010 are that it uses a cost-efficient method of folding the cover to minimize its size. Next, such an implementation provides a protective support to sheath 100 which is beneficial in deployment of sheath 100 as well as handling sheath 100 if deployment is performed by a single user. Moreover, sheath 100 may be folded into pouch 1015, which is rigid enough to hold sheath 100 in its folded configuration and makes it easier for the user to handle and use. Pouch-style deployment mechanism 1010 also provides a printable area onto which a manufacturer's logo or use information can be printed, as shown, for example, in FIG. 10A.

The foregoing description of exemplary implementations provides illustration and description but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

What is claimed is:

1. An ultrasound transducer sheath, comprising:
   a first portion comprising a first flexible material, the first portion forming a cylinder defining a passage between a first end and an opposite second end of the first portion;
   a second portion comprising a second flexible material, the second portion coupled to the first end of the first portion, the second portion forming an impermeable planar layer having an exterior surface and an opposing interior surface;
   a silicone adhesive layer formed on the interior surface of the impermeable planar layer, the silicone adhesive layer configured to adhere to an ultrasound transducer and form a positive acoustic coupling between the ultrasound transducer and the ultrasound transducer sheath; and
   a first hydrophilic coating layer formed on the exterior surface of the impermeable planar layer, the first hydrophilic coating layer configured to contact a patient's skin and selectively activated upon contacting water or saline to form an acoustic coupling interface between the ultrasound transducer, the ultrasound transducer sheath, and the patient.

2. The ultrasound transducer sheath of claim 1, wherein the second portion further comprises a substrate layer having a first side forming the exterior surface and an opposite second side forming the interior surface, the first hydrophilic coating layer provided on the first side of the substrate layer, and the silicone adhesive layer provided on the second side of the substrate layer.

3. The ultrasound transducer sheath of claim 2, wherein the second portion further comprises a second hydrophilic coating layer provided on the second side of the substrate layer, the second hydrophilic coating layer selectively activated upon contacting water or saline to provide the acoustic coupling interface between the ultrasound transducer, the ultrasound transducer sheath, and the patient.

4. The ultrasound transducer sheath of claim 2, wherein the substrate layer comprises polyurethane, the substrate layer having a thickness of 0.025 millimeter (mm) to 1.0 mm.

5. The ultrasound transducer sheath of claim 1, wherein the first flexible material is different from the second flexible material.

6. The ultrasound transducer sheath of claim 1, wherein the second portion is one of integrated with or joined to the first portion to form an integrated sheath.

7. The ultrasound transducer sheath of claim 1, wherein the second portion is formed perpendicular to the first portion.

8. The ultrasound transducer sheath of claim 1, wherein the first hydrophilic coating layer forms a continuous layer on the exterior surface of the impermeable planar layer.

9. A protective sheath assembly for covering an ultrasound transducer, comprising:
  a sheath comprising:
    a tubular portion formed of a first flexible material and having a first end and a second end; and
    a planar portion secured to the first end of the tubular portion to close the first end of the tubular portion,
  wherein the planar portion is formed of a second flexible material that is different from the first flexible material, the second flexible material comprising:
    a substrate layer; and
    at least one hydrophilic coating layer applied to a surface of the substrate layer,
    wherein the at least one hydrophilic coating layer is configured to be activated by water or saline prior to use to provide an acoustic coupling interface between the ultrasound transducer and a patient,
  a ring-shaped applicator; and
  at least one elastic band,
  wherein the ring-shaped applicator is fixedly secured to the second end of the tubular portion, and includes a substantially oval or cylindrical configuration,
  wherein the tubular portion of the sheath is folded over the ring-shaped applicator into a collapsed configuration such that the planar portion is flush with a bottom of the ring-shaped applicator, and
  wherein, the at least one elastic band is positioned over the sheath and the ring-shaped applicator such that upon deployment, the at least one elastic band is transitioned from the ring-shaped applicator to the ultrasound transducer as the sheath is unfolded from the ring-shaped applicator.

10. The protective sheath assembly of claim 9, wherein the ring-shaped applicator further comprises a circumferential lip to aid in deployment of the sheath.

* * * * *